United States Patent [19]

Paul

[11] 4,453,207
[45] Jun. 5, 1984

[54] DC TO AC POWER INVERTER

[75] Inventor: Steven J. Paul, Necedah, Wis.

[73] Assignee: Best Energy Systems For Tomorrow, Inc., Necedah, Wis.

[21] Appl. No.: 363,794

[22] Filed: Mar. 31, 1982

[51] Int. Cl.³ .......................................... H02M 7/515
[52] U.S. Cl. ..................................... 363/139; 363/57; 363/96; 323/209
[58] Field of Search ..................................... 363/27-28, 363/57-58, 96, 135-138, 139; 323/209-211

[56] References Cited

U.S. PATENT DOCUMENTS

| | | | |
|---|---|---|---|
| 3,452,266 | 6/1969 | Borden et al. | 363/27 |
| 3,605,003 | 9/1971 | Guggi | 363/96 X |
| 3,784,893 | 1/1974 | Rando | 363/28 X |
| 3,805,141 | 4/1974 | Pompa, Jr. et al. | 363/135 |
| 4,063,301 | 12/1977 | Lye | 323/210 X |
| 4,317,076 | 2/1982 | Price | 323/210 |

Primary Examiner—Peter S. Wong

Attorney, Agent, or Firm—Michael Piontek

[57] ABSTRACT

The DC to AC power inverter is of the class B, C, D or E type and includes a battery, at least one power SCR and associated capacitor circuitry, at least one input winding on a main transformer core and at least one output secondary winding on the transformer core. Such inverter requires a quiescent current to establish operating current for capacitor commutation charge and includes a feedback loading circuit for feeding current generated by the quiescent current back to the battery. The inverter also includes a self-detecting load demand circuit coupled to a line from said output winding for cyclically energizing the inverter, for sensing a minimum AC load and for holding said inverter in an energized state until less than a minimum AC load is sensed during an energizing cycle. Further the invention includes automatic power factor correction circuitry for supplying full time leading power factor correction to a load, with the automatic power factor correction circuitry being sensitive to light reactive loads.

39 Claims, 5 Drawing Figures

DC TO AC POWER INVERTER

BACKGROUND OF THE INVENTION

1. Field of the Invention

The present invention relates to improvements in a DC to AC power inverter. More specifically, the present invention relates to improvements in a load demand sensing circuit of the inverter, a quiescent operating current and feedback circuit for the inverter, and an automatic power factor correction circuit of the inverter.

2. Description of the Prior Art

Heretofore DC to AC inverters were turned on after a load was applied to the inverter, and it was necessary to sense a load applied to the inverter before turning on the inverter. This was typically done by sensing a load using a DC bias on the AC circuit while the AC output of the inverter was turned off and isolated. By sensing a DC current, one could determine if a load had been placed on the inverter. In this way, once a predetermined DC current was sensed, the inverter was turned on, and AC power was delivered to the load. At the same time, a relay was activated to isolate the DC bias so as not to harm the DC current sensing circuit. After the inverter was turned on to supply AC power to the load an AC current sensing circuit was actuated to sense the AC power applied and to keep the AC power output of the inverter turned on.

Once the AC current had fallen below a predetermined value, the AC output power of the inverter was turned off and the DC bias and current sensing circuit was reapplied to the output lines of the inverter.

When using a DC bias and a DC current sensing circuit coupled to the output lines of the inverter to detect the presence of a load, any basically alternating current device such as a wall clock or doorbell transformer appeared as a large load to the DC current sensing circuit because such devices appeared as a short circuit to the DC bias. Accordingly, the inverter was turned on to supply AC current and the AC sensing circuit was sensitive enough to stay on after the DC current sensing circuit caused the inverter to be turned on. Additionally, the AC current sensing circuit was very sensitive so as to detect minute AC current loads which in the case of an old electrical wiring installation, could cause the inverter to stay on even if the actual load is removed. This was due to leakage current in the old electrical wiring. Moreover there were times when long lines to a power tool had sufficient leakage current so as to indicate to the AC current sensing circuit a load which in actuality did not exist.

As will be described in greater detail hereinafter, the inverter of the present invention provides a self-detecting, load demand circuit which cyclically energizes the inverter while at the same time sensing AC current draw from the inverter. If AC current draw is sensed, the load demand circuit is constructed to keep the inverter energizing logic in an on mode to keep the inverter energized.

Heretofore DC to AC power inverters of the class B, C, D or E type, namely those which utilize an SCR, required relatively high input currents at no load. A no load current draw is necessary to establish a capacitor commutation charge in the capacitor circuitry associated with the SCRs. Typically resistive loading is provided to establish the required current draw. Of course, the current drained off the battery is dissipated in the resistors, thereby reducing the batteries useful capability.

As will be described in greater detail hereinafter, the inverter of the present invention provides a feedback circuit through the SCRs establishing satisfactory capacitory communication charge. The current is then, via the primary winding and a feedback winding, stepped to a higher voltage and rectified and returned to the battery. In this way, the current drawn for satisfactory SCR operation is fed back to the battery to significantly decrease battery drain and increase the efficiency of the inverter in a standby or no load mode.

While previous power factor correction circuits have worked well, particularly with smaller capacity inverters, of say 5 kilowatts, such circuits have not worked well with a larger inverter, say on the order of 12 kilowatts.

Also heretofore disadvantages had been incurred with previous power factor correction circuitry. More specifically, previous power factor correction circuitry was not sensitive to light reactive loads and did not feed enough leading power factor correction for large reactive loads such as could be used with a 12 kilowatt inverter. This was due to the fact that the power factor correction was switched in only at the end of a half cycle. As will be described in greater detail hereinafter, the inverter of the present invention includes automatic power factor correcting circuitry which supplies full time leading power factor correction, which is very sensitive to light reactive loads, and works well with inverters of greater than 5 kilowatts capacity.

SUMMARY OF THE INVENTION

According to the invention, there is provided in a DC to AC power inverter of the class B,C,D, or E type which includes a battery, at least one power SCR and associated capacitor circuitry and at least one input winding on a main transformer core and which requires a quiescent current to establish operating current for capacitor commutation charge, the improvement comprising circuit means for feeding current generated by the quiescent current back to the battery; said circuit means including an isolated feedback winding on the main transformer core and rectifying means coupled directly between said feedback winding and the battery; and said feedback winding having a slightly higher number of turns than said input winding such that a voltage slightly higher than the battery voltage is generated across said feedack winding so that there is a current draw by the battery from said feedback winding sufficient to establish said quiescent current through the input winding for quiescent operation required for capacitor commutation charge.

Further, according to the invention, there is provided in a DC to AC power inverter of the class B,C,D or E type which includes a battery, at least one power SCR and associated capacitor circuitry, and at least one input winding on a main transformer core, which also has thereon at least one secondary output winding, the improvement comprising selfdetecting load demand circuit means coupled to a line from said output winding for cyclically energizing the inverter, for sensing a minimum AC load across said secondary winding, and upon sensing a minimum AC load, for holding said inverter in an energized state until less than a minimum AC load is sensed during an energizing cycle; said load demand circuit means including a current transformer circuit having a primary winding comprised of at least one turn formed by a line from one end of the output secondary winding; and a multi-turn secondary winding, such that a load current flowing through said line generates a voltage across said secondary winding; means for cyclically energizing said inverter; means for sensing a load current flowing in the output secondary winding; and, means for holding said inverter in an energized state when and while a minimum load current is flowing through the output secondary winding, said energizing means including a timer which supplies an enable signal every few seconds to said holding means.

Still further, according to the invention there is provided in a DC to AC power inverter of the class B,C,D or E type which includes a battery, at least one power SCR and associated capacitor circuitry, a main transformer core, at least one input winding on the main transformer core, and at least one output secondary winding on the main transformer core, the improvement comprising automatic power factor correction circuitry for supplying full time leading power factor correction to a load, said automatic power factor correction circuitry being sensitive to light reactive loads and including a power factor correction capacitor, switching means in series with said capacitor and operable to place said power factor correction capacitor in parallel with the load on said output secondary winding, a signal source in said inverter producing a signal having a frequency greater than the inverter output frequency, means for differentiating said signal, first circuit means coupled to said differentiated signal and coupled to the voltage across the load, said first circuit means having a dv/dt sensing circuit and and an output coupled to said switching means and being operable to operate said switching means to place said power factor correction capacitor in parallel with the load on a trailing edge of a cycle of the inverter output waveform when a dv/dt above a certain threshold dv/dt is sensed by said sensing circuit, and second circuit means connected to have an input voltage proportional to an inductive reactive load and an input coupled to said differentiated signal, the output of said second circuit means also being coupled to said switching means, and said second circuit means being operable to operate said switching means to hold said power factor correction capacitor in parallel with the load after the dv/dt sensed by said sensing circuit has fallen below said threshold dv/dt as long as the load is connected to the inverter.

DESCRIPTION OF THE PREFERRED EMBODIMENT

Figure 1:
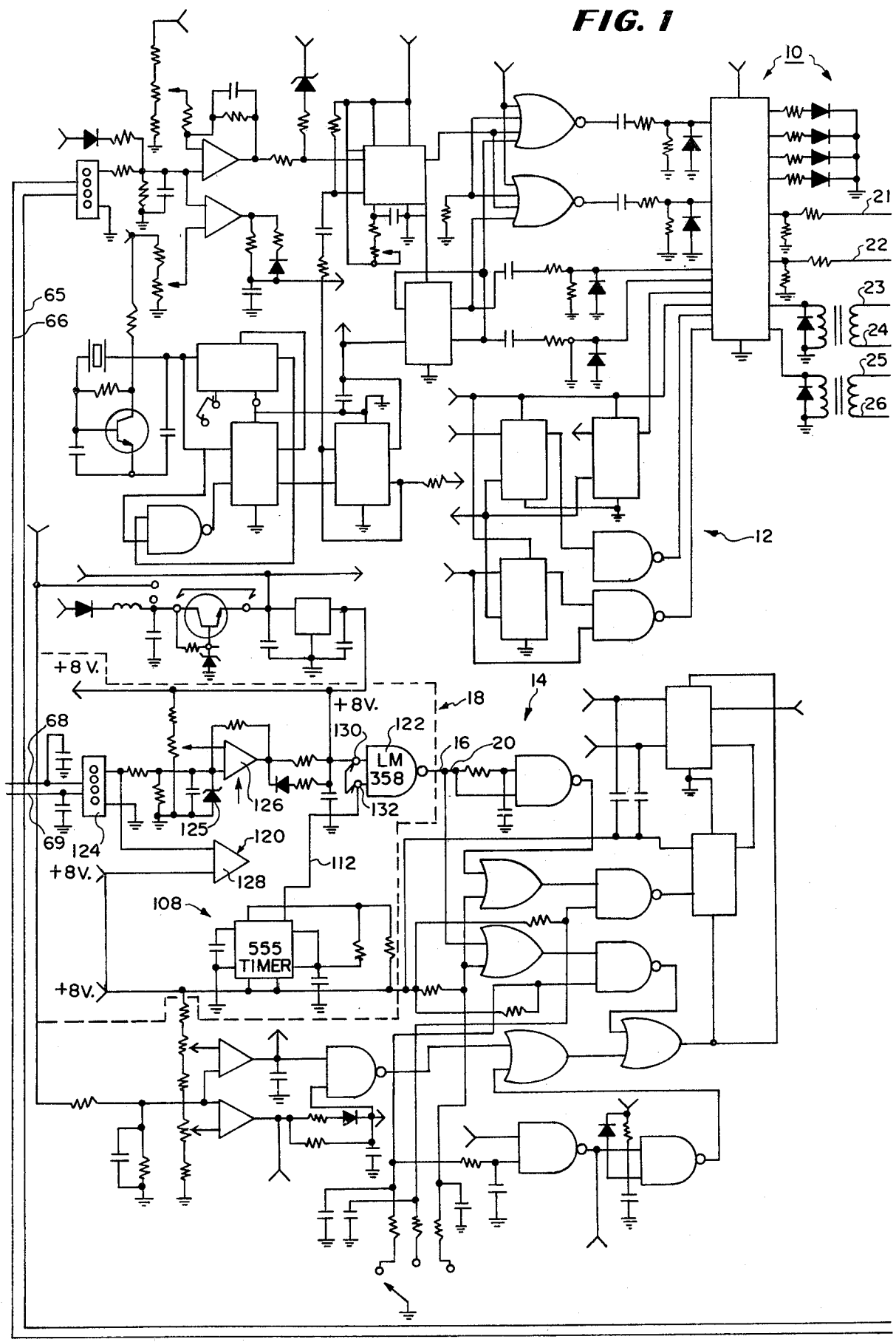
FIG. 1 is a block schematic diagram of a portion of the electrical circuit of the inverter of the present invention and shows therein the self-detecting load demand circuitry of the present invention coupled to the inverter energizing logic.
Figure 2:
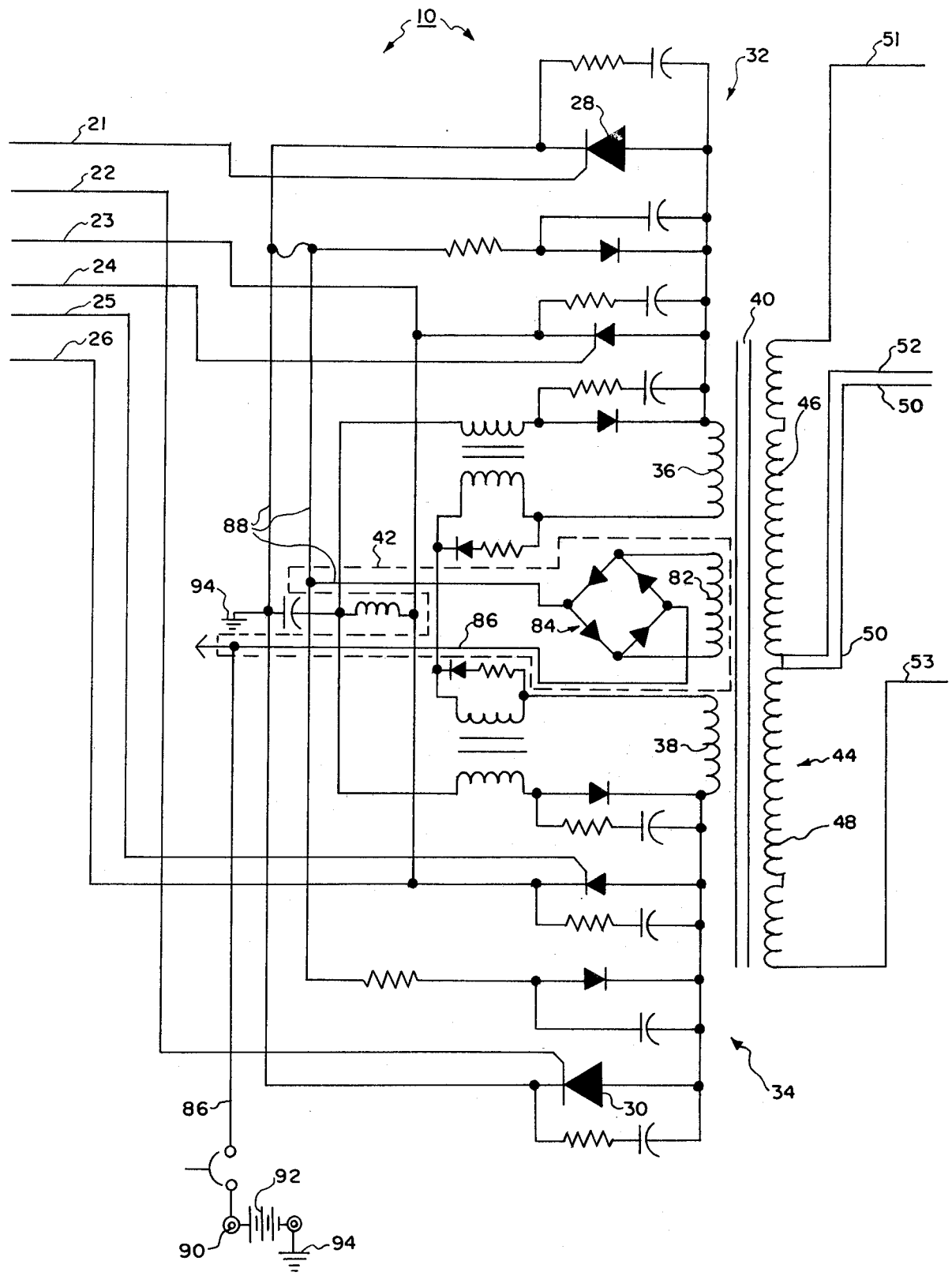
FIG. 2 is a schematic electrical circuit diagram of another portion of the inverter of the present invention and shows the main transformer of the inverter including the feedback loading circuit, the power SCRs and the associated capacitor circuitry which are coupled to the circuitry shown in FIG. 1.
Figure 3:
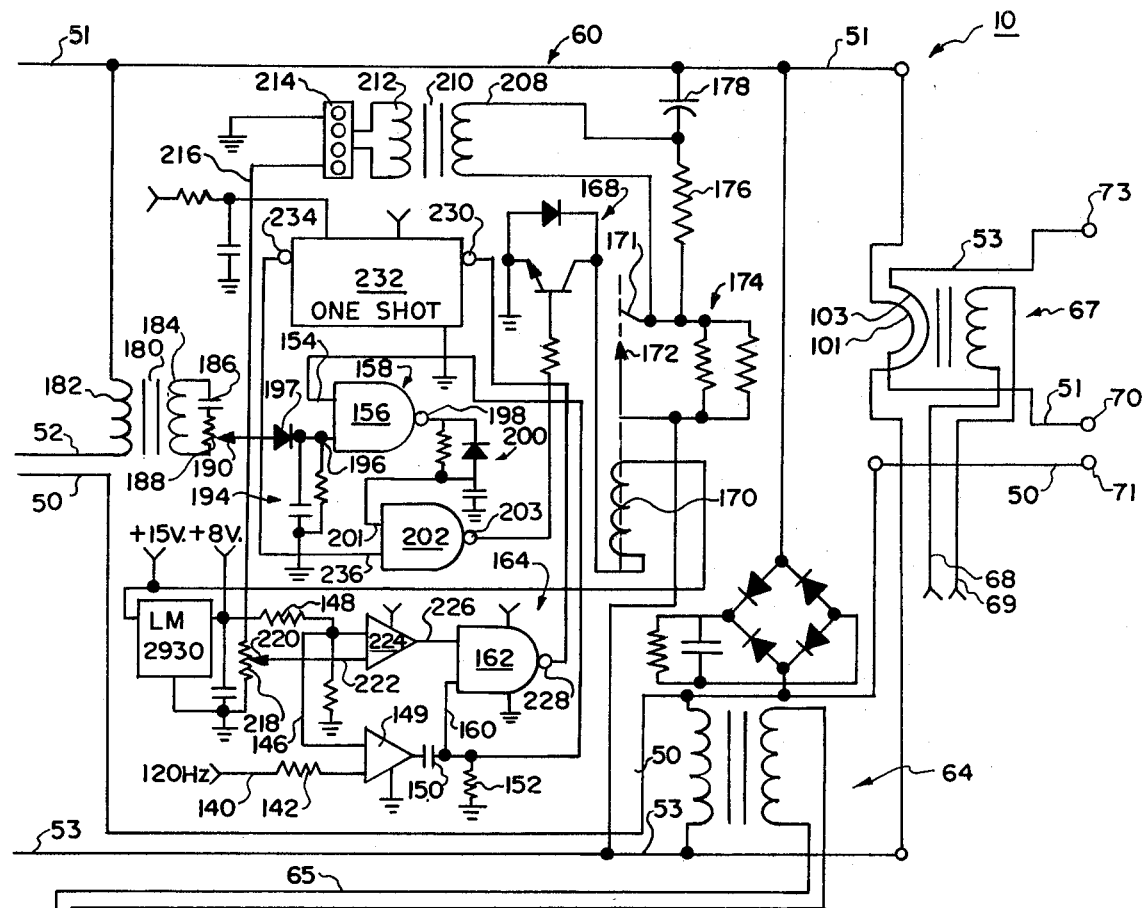
FIG. 3 is a schematic circuit diagram of the circuitry coupled to the output secondary winding of the main transformer shown in FIG. 2 and shows the automatic power factor correcting circuit of the inverter of the present invention.

Referring now to FIGS. 1, 2 and 3, there is illustrated therein the DC to AC power inverter of the present invention which is generally identified by the reference numeral 10 and which includes control circuitry 12 and inverter energizing logic 14 which are shown in FIG. 1. The control circuitry 12 and the energizing logic 14 are of conventional design. As shown in FIG. 1, an output 16 from a self-detecting load demand circuit 18 constructed and operated in accordance with the teachings of the present invention as will be described in greater detail hereinafter, is coupled to an input 20 of the inverter energizing logic 14.

As shown, the control circuitry 12 is coupled by lines 21–26 to the two power SCRs 28 and 30 and associated capacitor circuitry 32 and 34 shown in FIG. 2 which are coupled to first and second input windings 36 and 38 on a main transformer core 40 shown in FIG. 2.

Also coupled to the main transformer core 40 is a feedback loading circuit 42 constructed and operated in accordance with the teachings of the present invention as will be described in greater detail hereinafter.

As shown in FIG. 2, the main transformer core also has a secondary winding 44 thereon which has two sections 46 and 48 and a center tap 50 and 52. It will be appreciated that a modified AC square wave 240 volt 60 Hz waveform is generated across the secondary winding 44 with 120 volts appearing across the output secondary winding section 46 and 120 volts appearing across the output secondary winding section 48.

As shown in FIGS. 2 and 3, output lines 50–53 from the secondary winding 44 are coupled to an automatic power factor correction circuit 60 constructed and operated in accordance with the teachings of the present invention as will be described in greater detail hereinafter.

As shown in FIG. 3 a sensing circuit 64 of the control circuitry 12 is coupled across lines 50, 51 and 53 and is coupled by lines 65 and 66 to the control circuitry 12 shown in FIG. 1.

Also an isolating transformer circuit 67 is coupled to lines 51 and 53 and has output lines 68 and 69 which are coupled to the self-detecting load demand circuit 18 in FIG. 1. The isolating transformer 67 functions as an AC current load sensing circuit as will be described in greater detail hereinafter in connection with the description of the load demand circuit 18 and forms a part of the load demand circuit 18.

The load connected to the inverter is connected to output terminals 70, 71 and 73 at the ends of lines 50, 51 and 53 as shown in FIG. 3, and more particularly between terminals 70 and 73 if 240 volts are desired or terminal 71 and terminal 70 or 73 if 120 volts are desired.

Figure 4:
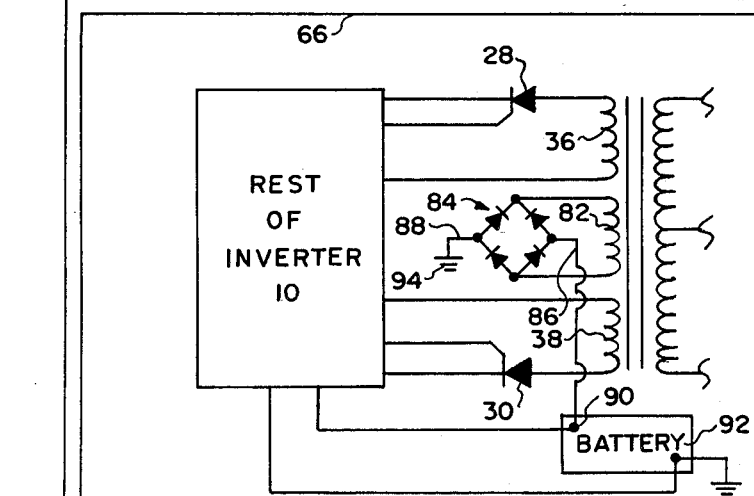
FIG. 4 is a simplified schematic circuit diagram of the feedback loading circuit of the inverter of the present invention.

Referring now to FIGS. 2 and 4 the feedback loading circuit 42 forming part of the inverter 10 of the present invention includes a feedback coil 82 that has a few more turns than the input windings 36 and 38. Typically, the feedback coil has approximately 4% more turns than either of the input windings 36 and 38, with the turns ratio typically being 41 turns in each of the input coils or windings 36 and 38 and 43 turns in the feedback coil or winding 82. The output of the feedback winding 82 is rectified by a full wave diode bridge rectifying circuit 84 forming part of the feedback loading circuit 42. Output leads 86 and 88 from the rectifying bridge circuit 84 are coupled respectively to the positive input 90 of the battery 92 and system ground 94.

In operation, the higher voltage generated across the feedback winding 82 by reason of the slightly higher number of turns therein causes a current draw from the feedback winding 82 through the rectifying bridge 84 to the battery 92. In the meantime, of course, current is being drawn from the battery for energizing the input windings 36 and 38 and the current drawn by the feedback winding 82 is sufficient to establish the necessary quiescent operating current through the input windings 36 and 38 which passes through the SCR s 28 and 30 and associated capacitor circuitry 32 and 34. Such current is typically 6 amps and is sufficient to maintain the necessary commutation charge on the capacitors in the capacitor circuits 32 and 34 necessary to provide the modified square wave current in the input or primary windings 36 and 38 for generating a modified square wave output voltage in the secondary winding 44.

At the same time, by establishing a current draw to the battery by reason of a higher voltage feedback coil 82, a minimum power drain is incurred during the quiescent operating state of the inverter 10 than would be incurred if a resistive load was inserted in the inverter circuit for establishing the quiescent operating current through the input windings 36 and 38.

Figure 5:
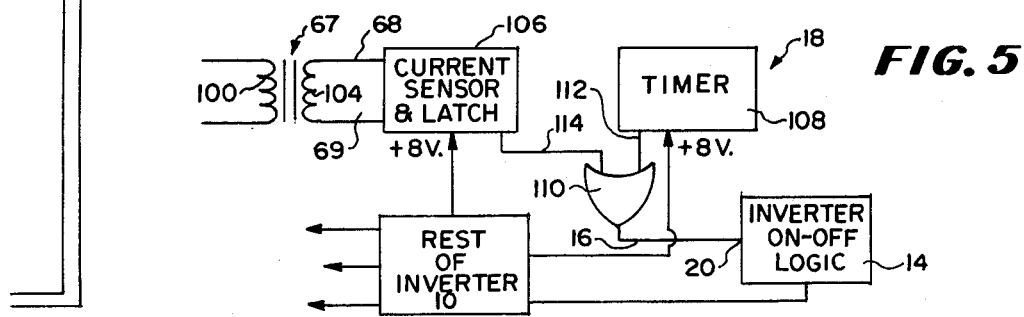
FIG. 5 is a simplified block schematic circuit diagram of the self-detecting load demand circuit of the inverter of the present invention.

Referring now to FIG. 5 and to FIGS. 1 and 3, the self-detecting load demand circuit 18 includes the isolating transformer 67 which has a primary winding 100 comprised of one turn 101 of line 51 and one turn 103 of line 53 such that the primary winding 100 has two turns 101 and 103 therein. A secondary winding 104 of the isolating transformer 67 typically has 175 to 350 turns therein and is coupled to a current sensing and latching circuit 106.

The version of the load demand circuit 18 shown in FIG. 5 also includes a timer circuit 108 and a OR gate 110. As shown, the current sensing and latching circuit 106 and the timer 108 are fed with eight volts from a regulated supply.

In the operation of the load demand circuit 18 shown in FIG. 5, the timer 108 which is typically a 555 timer circuit supplies a "turn-on" signal every few seconds via output line 112 to the OR gate 110, which "turn-on" signal is passed through the OR gate to output 16 of the circuit 18 and thereby to input 20 of the inverter on/off logic 14 to turn on the inverter. Once the inverter 10 is turned on, any load current flowing in line 51 and/or line 53 will generate an input voltage to the transformer 67 which is then multiplied by the multiturn secondary winding 104 to provide a voltage input to the current sensing and holding circuit 106. Circuit 106 rectifies the voltage and holds that voltage on an output line 114 from the current sensing and holding circuit 106 which is fed to the OR gate 110, thereby to maintain an output signal at the output 16, which is supplied to the input 20 of the inverter on/off logic 14 for maintaining the inverter 10 turned on while there is a load on the inverter 10, namely across terminals 71 and 70; 73 and 70 or 71 and 73.

Typically, the timer 108 is constructed and arranged to supply a turn on signal every 1 to 3 seconds to the OR gate 110.

Turning now to FIG. 1, it will be appreciated that the current sensing and holding function of the current sensing and holding circuit 106 and the gating function of the OR gate 110 are carried out by an operational amplifier 120 and a NAND gate 112.

As shown, the input lines 68 and 69 from the secondary winding 104 of the transformer 67 are fed to a full wave diode bridge rectifier 124. The output of the rectifier 124 is fed through a voltage clipping Zener diode 125, for over-voltage protection, to one section 126 of the operational amplifier 120 as shown. The other section 128 is utilized for a different purpose than load demand and will not be further described. The output from the section 126 of the operational amplifier 120 is then supplied to one input 130 of NAND gate 122 while the output line 112 from the timer 108 is fed to another input 132 of the NAND gate 122.

It will be understood that the operational amplifier 120 in conjunction with the NAND gate 122 and associated resistors, capacitors and diodes as shown will provide a OR gating function so that the inverter energizing (on/off) logic 14 will be energized every time a logic signal is supplied by the timer 108 via line 112 to the NAND gate 122, and that when sufficient AC current draw is sensed by the operational amplifier 120, the signal applied to the input 130 of the NAND gate 122 is such as to maintain an "inverter-on" signal at the input 20 of the inverter energizing logic 14.

The timer 108 supplies an output pulse sufficient to maintain the inverter on for at least one cycle. If no threshold current is detected by the operational amplifier 120 after the one cycle, the inverter energizing logic 14 is de-energized and maintained off for 1–3 seconds before another sample cycle takes place upon generation of another "on" signal from the timer 108.

When a sufficient threshold current is detected, meaning that a load has been coupled across two of the output terminals 70, 71, 73, the operational amplifier 120 holds the NAND gate 122 in a state where it produces an inverter "on" signal at the output 16 thereof which is supplied to the input 20 of the inverter energizing logic 14.

Referring now to FIG. 3, the automatic power factor correcting circuitry 60 is supplied with a 120 Hz square wave signal at an input 140 thereof. This 120 Hz signal is generated within the inverter 10 and then supplied to the input 140 and through resistor 142 to a comparator 144 which receives a reference voltage via a line 146 which is supplied from a plus eight volt source through a dropping resistor 148. The output of the comparator 144 is then differentiated through a capacitor 150 and resistor 152 and supplied to one input 154 of a first NAND gate 156 of a first, detecting circuit 158 and an input 160 of a second NAND gate 162 of a second, holding circuit 164.

As will be described in greater detail below, the first, detecting circuit 158 and the second, holding circuit 164 are utilized to operate a switching circuit 168 when a large reactive load is sensed connected across two terminals 70, 71 and 73. When such a highly reactive load is sensed coupled across two terminals 70, 71 and 73, the switching circuit 168 is energized to energize a coil 170 of a relay so as to close relay contacts 171 and 172 thereof to short out a high isolating resistance circuit 174 which is connected in series with a deQing resistor 176 and a power factor correcting capacitor 178 connected across lines 51 and 53. In this respect, when the first detecting circuit 158 senses a high dv/dt at the trailing edge of one cycle, the switching circuit 168 is energized to energize the relay 170 to short circuit the isolating resistance circuit 174 to place the deQing resistor 176 and power factor correcting capacitor 178 in parallel with the load. The dv/dt signal sensed disappears once the capacitor 178 is put in the circuit so that the second, holding circuit 164 is provided for holding the switching circuit 168 in an energized condition for at least one half cycle and this is accomplished by sensing the voltage across the deQing resistor 176 which is related to the amount of inductance in the load connected across two output terminals 70, 71 and 73.

Also as will be described in greater detail hereinafter the use of a 120 Hz signal, which is twice the frequency of the 60 Hz modified square wave output waveform from the inverter 10, ensures that the decision whether to activate the switching circuit 168 will only be made at the trailing end of a half cycle on the 60 Hz modified square output waveform.

Returning now to the first detecting circuit 158, it has already been described that a signal twice the frequency of the output waveform is generated by conventional means, as by an oscillator, supplied to the comparator 144, and compared with a reference voltage. When the 120 Hz signal exceeds the reference voltage, an output pulse is generated at the output of the comparator 44 and differentiated by the capacitor 150-resistor 152 circuit. This differentiated signal is supplied to the input 154 of the NAND gate 156. In the meantime, a dv/dt sensing circuit comprising an isolating transformer 180 having a primary winding 182 connected across the output secondary winding section 46 senses the voltage across the load, and such voltage is reflected in the secondary winding 184 of the transformer 180. A dv/dt sensing circuit comprised of a capacitor 186 and potentiometer 188 are connected across the secondary winding 184. When a voltage spike is added to the output voltage by an inductive reactive load discharging energy back into the circuit, the fast rate of voltage rise of the voltage spike, is sensed by the dv/dt sensing circuit comprised of capacitor 186 and potentiometer 188.

A similar dv/dt sensing circuit is disclosed in my previously mentioned copending application, the disclosure of which is incorporated herein by reference.

A wiper blade 190 of the potentiometer 188 is coupled through a diode 192 and an RC circuit 194 to another input 196 of the NAND gate 156. Now when there is a sufficiently large dv/dt signal sensed at the wiper blade 190 and supplied to the input 196 of the NAND gate 156, at the same time a pulse from differentiated 120 Hz signal is supplied to the input 154 of the NAND gate 156, a momentary low is present at an output 198 of the NAND gate 156. This low is supplied to a fast attack, slow release circuit 200 which then supplies a signal to input 201 of NAND gate 202 which forces output 203 thereof high to turn on a transistor 204 of the switching circuit 168. When transistor 204 is turned on, coil 170 is energized to close the relay contacts 171 and 172 to short out the isolating resistance circuit 174 thereby to couple the deQing resistor 176 and power factor correcting capacitor 178 across the load.

The fast attack, slow release circuit 200 comprised of a resistor, capacitor and diode as shown, lengthens the time when a low signal is applied to input 201 of NAND gate 202 thereby to maintain a high at output 203 of NAND gate 202 for a desired length of time.

Once the deQing resistor 176 is coupled across the load, a voltage is generated thereacross which is related to the amount of inductance in the inductive reactive load. This voltage is supplied to a primary winding 208 of an isolating transformer 210 having a secondary winding 212 which is coupled to a full wave diode rectifying bridge 214. The output from the diode rectifying bridge 214 is supplied via line 216 to a potentiometer 218. A wiper blade 220 of the potentiometer 218 supplies part of the rectified voltage from the rectifier bridge 214 to an input 222 of a comparator 224 which also has applied thereto the reference voltage on the line 146. When the voltage supplied to input 222 of comparator 224 exceeds the voltage on line 146, an output signal is supplied by the comparator 224 to another input 226 of the NAND gate 162 in the second, holding circuit 164 which also received the differentiated 120 Hz signal at its other input 160.

This causes an output signal to be generated at output 228 of NAND gate 162 which is supplied to an input 230 of a one shot circuit 232. The one shot circuit 232 then supplies an inverted, longer duration output pulse at its output 234 to another input 236 of the NAND gate 202. Typically this output pulse has a duration of 8.3 milliseconds which is equivalent to one half cycle of a 60 Hz signal. This will then cause a high to be generated at the output 203 of the gate 202 which is supplied to the base of the transistor 204 to maintain the base of the transistor 204 on for the following half cycle of the output waveform from the inverter 10.

As a result, the first, detecting circuit 158 serve to first detect a high dv/dt and when such as high dv/dt is detected a power factor correcting capacitor 178 and deQing resistor 176 are coupled in parallel with the load. Then, the second holding circuit 164 operates to maintain the power factor correcting capacitor 178 and deQing resistor 176 coupled across the load for at least one half cycle of the inverter output waveform.

From the foregoing description it will be apparent that the power inverter 10 of the present invention and more particularly the minimum feedback loading circuit 42 thereof, the self-detecting load demand circuit 18 thereof, and the automatic power factor correcting circuitry 60 thereof provide a number of advantages, some of which have been described above and others of which are inherent in the invention.

Also it will be apparent to those skilled in the art that modifications can be made to the power inverter 10 and circuits 42, 18 and 60 thereof without departing from the teachings of the invention. Accordingly, the scope of the invention is only to be limited as necessitated by the accompanying claims.

I claim:

1. In a DC to AC power inverter of the class B,C,D, or E type which includes a battery, at least one power SCR and associated capacitor circuitry and at least one input winding on a main transformer core and which requires a quiescent current to establish operating current for capacitor commutation charge, the improvement comprising circuit means for feeding current generated by the quiescent current back to the battery; said circuit means including an isolated feedback winding on the main transformer core and rectifying means coupled directly between said feedback winding and the battery; and said feedback winding having a slightly higher number of turns than said input winding such that a voltage slightly higher than the battery voltage is generated across said feedback winding so that there is a current draw by the battery from said feedback winding sufficient to establish said quiescent current through the input winding for quiescent operation required for capacitor commutation charge.

2. The inverter of claim 1 wherein said rectifying means include a full wave diode rectifier bridge.

3. The inverter of claim 1 wherein said feedback winding has approximately 4% more turns than said input winding.

4. In a DC to AC power inverter of the class B,C,D or E type which includes a battery, at least one power SCR and associated capacitor circuitry, and at least one input winding on a main transformer core, which also has thereon at least one secondary output winding, the improvement comprising self-detecting load demand circuit means coupled to a line from said output winding for cyclically energizing the inverter, for sensing a minimum AC load across said secondary winding, and upon sensing a minimum AC load, for holding said inverter in an energized state until less than a minimum AC load is sensed during an energizing cycle; said load demand circuit means including a current transformer circuit having a primary winding comprised of at least one turn formed by a line from one end of the output secondary winding; and a multi-turn secondary winding, such that a load current flowing through said line generates a voltage across said secondary winding; means for cyclically energizing said inverter; means for sensing a load current flowing in the output secondary winding; and, means for holding said inverter in an energized state when and while a minimum load current is flowing through the output secondary winding, said energizing means including a timer which supplies an enable signal every few seconds to said holding means.

5. The inverter of claim 4 wherein the turns in said multiturn secondary winding are approximately 85 or more times the turns in the primary winding.

6. The inverter of claim 4 wherein said sensing means include a current transformer having a primary winding coupled in series with the output secondary winding and a secondary winding.

7. The inverter of claim 6 wherein said sensing means include rectifying means coupled to said secondary winding.

8. The inverter of claim 7 wherein said rectifying means include a full wave diode bridge rectifying circuit.

9. The inverter of claim 7 wherein said holding means include at least a portion of an operational amplifier coupled to the output of said rectifying means and a NAND gate having a first input coupled to an output of said operational amplifier, said energizing means being coupled to a second input of said NAND gate and wherein said inverter includes inverter energizing logic circuitry coupled to the output of said NAND gate.

10. The inverter of claim 9 wherein said energizing means include a timer which supplies an enable signal every few seconds to said second input of said NAND gate.

11. The inverter of claim 10 wherein said second input of said NAND gate is also coupled to said secondary winding of said current transformer.

12. The inverter of claim 4 wherein said holding means include an OR gate having one input coupled to the output of said sensing means.

13. The inverter of claim 12 wherein the output of said OR gate is coupled to inverter logic energizing circuitry.

14. The inverter of claim 13 wherein said energizing means include a timer circuit having an output coupled to another input of said OR gate for cyclically applying an energizing signal to said OR gate which then outputs an energizing signal to said inverter logic energizing circuitry.

15. In a DC to AC power inverter of the class B,C,D or E type which includes a battery, at least one power SCR and associated capacitor circuitry, a main transformer core, at least one input winding on the main transformer core, and at least one output secondary winding on the main transformer core, the improvement comprising automatic power factor correction circuitry for supplying full time leading power factor correction to a load, said automatic power factor correction circuitry being sensitive to light reactive loads and including a power factor correction capacitor, switching means in series with said capacitor and operable to place said power factor correction capacitor in parallel with the load on said output secondary winding, a signal source in said inverter producing a signal having a frequency greater than the inverter output frequency, means for differentiating said signal, first circuit means coupled to said differentiated signal and coupled to the voltage across the load, said first circuit means having a dv/dt sensing circuit and an output coupled to said switching means and being operable to operate said switching means to place said power factor correction capacitor in parallel with the load on a trailing edge of a cycle of the inverter output waveform when a dv/dt above a certain threshold dv/dt is sensed by said sensing circuit and second circuit means connected to have an input voltage proportional to an inductive reactive load and an input coupled to said differentiated signal, the output of said second circuit means also being coupled to said switching means, and said second circuit means being operable to operate said switching means to hold said power factor correction capacitor in parallel with the load after the dv/dt sensed by said sensing circuit has fallen below said threshold dv/dt as long as the load is connected to the inverter.

16. The inverter of claim 15 wherein said first circuit means includes a NAND gate having one input coupled to said sensing circuit and another input coupled to said differentiated signal.

17. The inverter of claim 15 wherein said sensing circuit includes an isolating transformer and a capacitor and potentiomater connected across the secondary of said isolating transformer, a wiper of said potentiometer being coupled through a rectifying diode to one input of said first circuit means.

18. The inverter of claim 17 wherein said first circuit means include a NAND gate having one input coupled to said sensing circuit and another input coupled to said differentiated signal.

19. The inverter of claims 16 or 18 wherein said first circuit means include a fast attack, slow release circuit coupled to the output of said NAND gate for lengthening the output pulse from said NAND gate supplied to said switching means.

20. The inverter of claim 15, further comprising a deQing resistor in series with said power factor correction capacitor and said switching means.

21. The inverter of claim 20, further comprising a isolating resistance connected in parallel with said switching means and in series with said deQing resistor and power factor correction capacitor.

22. The inverter of claim 21 wherein said switching means include a relay having normally relay contacts each connected to one side of said isolating resistance, said relay, being operable to close said contacts to short circuit said isolating resistance, and said relay having a coil coupled in series with a power source through an emitter and collector of a transistor device, said switching means further including a gate having an output coupled to the base of said transistor device.

23. The inverter of claim 21 wherein said switching means include a relay having normally open relay contacts each connected to one side of said isolating resistance, said relay, when energized, being operable to close said relay contacts to short circuit said isolating resistance, and said relay having a coil coupled in series with a power source through the emitter and collector of a transistor device and said switching means further including a NAND gate having an output coupled to the base of said transistor device and an input coupled to said first circuit means.

24. The inverter of claim 23 wherein said rectifying circuit is a full wave diode rectifying bridge.

25. The inverter of claim 20 wherein said second circuit means include an isolating transformer having a primary coupled across said deQing resistor, and a full wave rectifying circuit coupled across said secondary of said isolating transformer.

26. The inverter of claim 25 wherein said output of said rectifying circuit is coupled to a potentiometer.

27. The inverter of claim 26 wherein said second circuit means include a NAND gate having one input coupled to the output of said comparator and another input coupled to said differentiated signal.

28. The inverter of claim 27 wherein said second circuit means include a one shot circuit having an input coupled to the output of said NAND gate and having an output coupled to said switching means.

29. The inverter of claim 27 wherein said switching means include a relay having relay contacts each connected to one side of said isolating resistance, said relay being operable to close said relay contacts to short circuit said isolating resistance, and said relay having a coil coupled in series with a power source through a transistor device and said switching means further including a NAND gate having an output coupled to the base of said transistor device and an input coupled to the output of said one short circuit.

30. The inverter of claim 25 wherein said second circuit means include a comparator having an input coupled to said rectifying circuit and another input connected to a reference voltage.

31. The inverter of claim 15 wherein said signal source frequency is twice the inverter frequency.

32. The inverter of claim 15 wherein said signal source produces a 120 Hz signal and said inverter frequency is 60 Hz.

33. The inverter of claim 15 wherein said second circuit means include an isolating transformer having a primary receiving said input voltage, and a full wave rectifying circuit coupled across said secondary of said isolating transformer.

34. The inverter of claim 33 wherein said rectifying circuit is a full wave diode rectifying bridge.

35. The inverter of claim 33 wherein said rectifying circuit is coupled to a potentiometer.

36. The inverter of claim 33 wherein said second circuit means include a comparator having an input coupled to said rectifying circuit and another input connected to a reference voltage.

37. The inverter of claim 36 wherein said second circuit means include a NAND gate having one input coupled to the output of said comparator and another input coupled to said differentiated signal.

38. The inverter of claim 37 wherein said second circuit means include a one shot circuit having an input coupled to the output of said NAND gate and having an output coupled to said switching means.

39. In a DC to AC power inverter of the class B,C,D or E type which includes a battery, at least one power SCR and associated capacitor circuitry, at least one input winding on a main transformer core, the input winding requiring a quiescent current to establish operating current for capacitor commutation charge and the transformer core having at least one secondary output winding, the improvement comprising: circuit means including an isolated feedback winding on the main transformer and rectifying means coupled between said feedback winding and the battery for feeding current generated by the quiescent current back to the battery, self-detecting load demand circuit means coupled to a line from said output winding for cyclically energizing the inverter, for sensing a minimum AC load across said secondary winding, and upon sensing a minimum AC load, for holding said inverter in an energized state until less than a minimum AC load is sensed during an energizing cycle; and automatic power factor correction circuitry for supplying full time leading power factor correction to a load, said automatic power factor correction circuitry being sensitive to light reactive loads.

* * * * *